(12) United States Patent
Fukasawa

(10) Patent No.: US 8,823,960 B2
(45) Date of Patent: Sep. 2, 2014

(54) SETTING VALUE MANAGEMENT APPARATUS, SETTING VALUE MANAGEMENT METHOD, AND COMPUTER-READABLE MEDIUM

(75) Inventor: Nobuaki Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 13/529,281

(22) Filed: Jun. 21, 2012

(65) Prior Publication Data

US 2012/0327446 A1 Dec. 27, 2012

(30) Foreign Application Priority Data

Jun. 27, 2011 (JP) .................................. 2011-142311

(51) Int. Cl.
*G06K 15/02* (2006.01)
*H04N 1/00* (2006.01)
*G06F 3/12* (2006.01)

(52) U.S. Cl.
CPC ....... *H04N 1/00344* (2013.01); *H04N 1/00973* (2013.01); *H04N 1/0097* (2013.01); *G06F 3/1231* (2013.01)
USPC ........................... 358/1.13; 358/1.1; 358/1.15

(58) Field of Classification Search
CPC ... G06K 15/02; G06K 15/1805; G06K 15/40; G06K 15/402; G06F 3/1231; G06F 3/1237; G06F 3/1253; G06F 3/1254; G06F 3/1255; G06F 3/1258
USPC ........ 358/1.1, 1.9, 1.13, 1.15, 1.16, 400, 401, 358/448, 296
See application file for complete search history.

(56) References Cited

U.S. PATENT DOCUMENTS

| | | | |
|---|---|---|---|
| 7,506,142 B2 * | 3/2009 | Yoshimura et al. | ................ 713/1 |
| 7,511,848 B2 * | 3/2009 | Crosier et al. | ............... 358/1.15 |
| 7,583,398 B2 * | 9/2009 | Kaneshiro et al. | ........... 358/1.15 |
| 7,710,587 B2 * | 5/2010 | Crosier et al. | ............... 358/1.15 |
| 8,451,464 B2 * | 5/2013 | Oshima | ........................ 358/1.13 |
| 2002/0196451 A1* | 12/2002 | Schlonski et al. | ............. 358/1.1 |
| 2008/0240740 A1* | 10/2008 | Asano | ............................... 399/2 |
| 2009/0066991 A1* | 3/2009 | Lee et al. | ..................... 358/1.15 |
| 2009/0296144 A1 | 12/2009 | Fukasawa | .................... 358/1.15 |
| 2012/0320415 A1* | 12/2012 | Nakamura | ................... 358/1.15 |

FOREIGN PATENT DOCUMENTS

JP 2007-130838 A 5/2007

\* cited by examiner

*Primary Examiner* — Thomas D Lee
(74) *Attorney, Agent, or Firm* — Fitzpatrick, Cella, Harper & Scinto

(57) ABSTRACT

A management apparatus comprises: a holding unit that holds configuration data defined for respective models of a plurality of image forming apparatuses or respective image forming apparatuses; a determination unit that determines whether a value defined in configuration data of a first image forming apparatus exceeds a range settable for a function of a second image forming apparatus; and a generation unit that, when the determination unit determines that the value defined in the acquired configuration data of the first image forming apparatus exceeds the settable range, newly generates configuration data to implement an operation to be executed based on the value defined in the configuration data of the first image forming apparatus by combining at least one other function executable by the second image forming apparatus.

11 Claims, 15 Drawing Sheets

| SETTING VALUE IDENTIFIER | DEFAULT VALUE | RANGE | CONDITION |
|---|---|---|---|
| copy_settings.nup | 1 in 1 | 1 in 1, 2 in 1, 4 in 1 | NONE |
| device_settings.cloud_address | "http://oanon.com/config" | 256 BYTES | NONE |
| device_settings.sleep_time | 10 MIN | 1 MIN, 10 MIN, 1H | NONE |
| fax_settings.received_print | OFF | ON, OFF | FACSIMILE UNIT |
| box_settings.server_address | "" | 256 BYTES | NONE |
| copy_settings.copies | 1 | 1-999 | NONE |
| scan_to_send.addresses | 1 | 1-100 | NONE |
| bt(n).1.copy.copies | copy_settings.copies | copy_settings.copies | CONVERTIBLE |
| bt(n).1.scan_to_send.addresses | scan_to_send.addresses | scan_to_send.addresses | CONVERTIBLE |
| bt(n).1.scan_to_box.boxno | 1 | 1-99 | CONVERTIBLE HDD |
| bt(n).1.box_to_print.copies | copy_settings.copies | copy_settings.copies | CONVERTIBLE HDD |

| SETTING VALUE IDENTIFIER | DEFAULT VALUE | RANGE | CONDITION |
|---|---|---|---|
| copy_settings.nup | 1 in 1 | 1 in 1, 2 in 1, 4 in 1 | NONE |
| device_settings.cloud_address | "http://oanon.com/config" | 256 BYTES | NONE |
| device_settings.sleep_time | 10 SEC | 10SEC, 1 MIN, 10 MIN, 1H | NONE |
| fax_settings.received_print | OFF | ON, OFF | FACSIMILE UNIT |
| box_settings.server_address | "" | 256 BYTES | NONE |
| copy_settings.copies | 1 | 1-99 | NONE |
| scan_to_send.addresses | 1 | 1-50 | NONE |
| bt(n).1.copy.copies | copy_settings.copies | copy_settings.copies | CONVERTIBLE |
| bt(n).1.scan_to_send.addresses | scan_to_send.addresses | scan_to_send.addresses | CONVERTIBLE |
| bt(n).1.scan_to_box.boxno | 1 | 1-40 | CONVERTIBLE HDD |
| bt(n).1.box_to_print.copies | copy_settings.copies | copy_settings.copies | CONVERTIBLE HDD |

F I G. 5

| | 502 | 503 | 504 | 505 |
|---|---|---|---|---|
| | DEVICE IDENTIFIER | VIRTUAL DEVICE COMPONENT DATA | VIRTUAL CONFIGURATION DATA | NOTIFICATION FLAG |
| | 010001 | 1 | 1 | NOTIFIED |
| | 010002 | 2 | 2 | NOTIFIED |
| | 020001 | 3 | 3 | NOT NOTIFIED |
| | 020002 | 4 | 4 | NOT NOTIFIED |

| DATA TYPE | VALUE |
|---|---|
| MODEL CODE | 0x01 |
| FIRMWARE VERSION | 00.01 |
| DEVICE IDENTIFIER | 010001 |
| FACSIMILE UNIT | PRESENT |
| HDD | 100G |

FIG. 6B

| DATA TYPE | VALUE |
|---|---|
| MODEL CODE | 0x02 |
| FIRMWARE VERSION | 01.00 |
| DEVICE IDENTIFIER | 020001 |
| FACSIMILE UNIT | ABSENT |
| HDD | 100G |

FIG. 6C

| DATA TYPE | VALUE |
|---|---|
| MODEL CODE | 0x02 |
| FIRMWARE VERSION | 01.00 |
| DEVICE IDENTIFIER | 020002 |
| FACSIMILE UNIT | ABSENT |
| HDD | 0G |

F I G. 7A

| SETTING VALUE IDENTIFIER | VALUE |
|---|---|
| bt1.1.copy.color | color |
| bt1.1.copy.copies | 120 |
| bt1.1.copy.nup | 2 in 1 |
| bt1.1.copy.2sided | 1-2 |

F I G. 7B

| SETTING VALUE IDENTIFIER | VALUE |
|---|---|
| bt1.1.scan_to_box.color | color |
| bt1.1.scan_to_box.boxno | 00 |
| bt1.1.scan_to_box.filename | 111122223333 |
| bt1.2.box_to_print.color | color |
| bt1.2.box_to_print.boxno | 00 |
| bt1.2.box_to_print.filename | 111122223333 |
| bt1.2.box_to_print.copies | 99 |
| bt1.2.box_to_print.nup | 2 in 1 |
| bt1.2.box_to_print.2sided | 1-2 |
| bt1.3.box_to_print.color | color |
| bt1.3.box_to_print.boxno | 00 |
| bt1.3.box_to_print.filename | 111122223333 |
| bt1.3.box_to_print.copies | 21 |
| bt1.3.box_to_print.nup | 2 in 1 |
| bt1.3.box_to_print.2sided | 1-2 |
| bt1.3.box_to_print.delete | 111122223333 |

FIG. 8A

| SETTING VALUE IDENTIFIER | VALUE |
|---|---|
| bt5.1.scan_to_send.color | color |
| bt5.1.scan_to_send.resolution | 200x200 |
| bt5.1.scan_to_send.ad1 | 111@oanon.com |
| bt5.1.scan_to_send.ad2 | 222@oanon.com |
| bt5.1.scan_to_send.ad3 | 333@oanon.com |
| . . . . . | . . . . . |
| . . . . . | . . . . . |
| bt5.1.scan_to_send.ad70 | 707070@oanon.com |
| bt5.1.scan_to_send.addresses | 70 |

FIG. 8B

| SETTING VALUE IDENTIFIER | VALUE |
|---|---|
| bt5.1.scan_to_box.color | color |
| bt5.1.scan_to_box.boxno | 00 |
| bt5.1.scan_to_box.filename | file111 |
| bt5.2.box_to_send.boxno | 00 |
| bt5.2.box_to_send.filename | file111 |
| bt5.2.box_to_send.resolution | 200x200 |
| bt5.2.box_to_send.ad1 | 111@oanon.com |
| bt5.2.box_to_send.ad2 | 222@oanon.com |
| bt5.2.box_to_send.ad3 | 333@oanon.com |
| . . . . . | . . . . . |
| bt5.2.box_to_send.ad50 | 505050@oanon.com |
| bt5.2.box_to_send.addresses | 50 |
| bt5.3.box_to_send.boxno | 00 |
| bt5.3.box_to_send.filename | file111 |
| bt5.3.box_to_send.relsolution | 200x200 |
| bt5.3.box_to_send.ad1 | 515151@oanon.com |
| bt5.3.box_to_send.ad2 | 525252@oanon.com |
| bt5.3.box_to_send.ad3 | 535353@oanon.com |
| . . . . . | . . . . . |
| bt5.3.box_to_send.ad20 | 707070@oanon.com |
| bt5.3.box_to_send.addresses | 20 |
| bt5.3.box_to_send.delete | file111 |

FIG. 9A

| SETTING VALUE IDENTIFIER | VALUE |
| --- | --- |
| box_settings.server_address | ¥¥server1¥share¥ |
| bt1.1.scan_to_box.color | color |
| bt1.1.scan_to_box.resolution | 200x200 |
| bt1.1.scan_to_box.boxno | 02 |

FIG. 9B

| SETTING VALUE IDENTIFIER | VALUE |
| --- | --- |
| box_settings.server_address | ¥¥server1¥share¥ |
| bt1.1.scan_to_box.color | color |
| bt1.1.scan_to_box.resolution | 200x200 |
| bt1.1.scan_to_box.srv | ¥¥server1¥share¥ |

F I G. 15
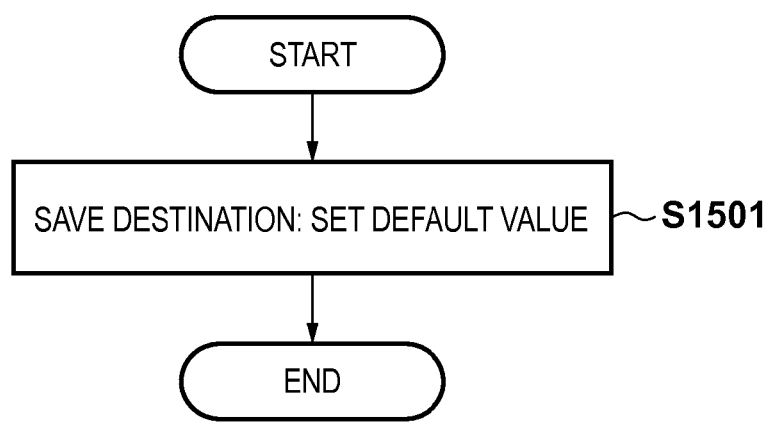

SETTING VALUE MANAGEMENT APPARATUS, SETTING VALUE MANAGEMENT METHOD, AND COMPUTER-READABLE MEDIUM

BACKGROUND OF THE INVENTION

1. Field of the Invention

The present invention relates to a setting value management apparatus, setting value management method, and computer-readable medium. Particularly, the present invention relates to a technique of reflecting, in another image forming apparatus, configuration data serving as setting values for switching the operation of an image forming apparatus.

2. Description of the Related Art

Some image forming apparatuses store configuration data serving as setting values for switching the operation. Configuration data is stored in the storage device of each image forming apparatus. To change configuration data of all image forming apparatuses, setting needs to be executed for the number of image forming apparatuses. To omit this cumbersome operation, there is a technique for setting configuration data at once in a plurality of image forming apparatuses from an information processing apparatus.

There is also proposed a technique of managing configuration data at once by arranging configuration data in a location where it can be referred to via a network, and referring to the same configuration data by a plurality of image forming apparatuses (for example, Japanese Patent Laid-Open No. 2007-130838).

Some image forming apparatuses include a preset button for storing setting values in advance. Setting data of this preset button is also part of configuration data.

Various models are proposed for image forming apparatuses, and the setting range of configuration data often differs between the respective models. For example, the settable range is wide for a high-end model physically having a large memory capacity and narrow for a low-end model having a small memory capacity. Hence, configuration data is prepared for each model. Every time configuration data is reflected from a given model to another, the administrator needs to change/delete configuration data exceeding the setting range.

If configuration data is arranged on a network without changing or deleting it, an image forming apparatus which refers to it rejects settings exceeding the range or makes settings only within the setting range, and cannot reflect the same settings. For example, as for a transmission destination count registered for the ScanToSend preset button, a high-end model allows registering 100 destinations, and a low-end model allows registering up to 50 destinations. In case of generation of a fault during transmission, untransmitted data is often saved in a memory such as a static RAM. However, the static RAM is generally expensive, so the above limitation is placed. In this case, the settings of the ScanToSend preset button of the high-end model in which 70 destinations are registered cannot be reflected in the low-end model.

SUMMARY OF THE INVENTION

According to one aspect of the present invention, there is provided a setting value management apparatus which manages configuration data of a plurality of image forming apparatuses, comprising: a holding unit configured to hold configuration data defined for respective models of the plurality of image forming apparatuses or respective image forming apparatuses; an acquisition unit configured to acquire configuration data of a first image forming apparatus from the holding unit; a determination unit configured to determine whether a value defined in the acquired configuration data of the first image forming apparatus exceeds a range settable for a function of a second image forming apparatus; and a generation unit configured to, when the determination unit determines that the value defined in the acquired configuration data of the first image forming apparatus exceeds the settable range, newly generate configuration data to implement an operation to be executed based on the value defined in the configuration data of the first image forming apparatus by combining at least one other function executable by the second image forming apparatus.

According to another aspect of the present invention, there is provided a setting value management method of managing configuration data of a plurality of image forming apparatuses, comprising the steps of: holding, in a storage unit, configuration data defined for respective models of the plurality of image forming apparatuses or respective image forming apparatuses; acquiring configuration data of a first image forming apparatus from the storage unit; determining whether a value defined in the acquired configuration data of the first image forming apparatus exceeds a range settable for a function of a second image forming apparatus; and generating, when the value defined in the acquired configuration data of the first image forming apparatus is determined in the determination step to exceed the settable range, newly configuration data to implement an operation to be executed based on the value defined in the configuration data of the first image forming apparatus by combining at least one other function executable by the second image forming apparatus.

According to another aspect of the present invention, there is provided a non-transitory computer-readable medium storing a program for causing a computer to function as a holding unit configured to hold configuration data defined for respective models of a plurality of image forming apparatuses or respective image forming apparatuses, an acquisition unit configured to acquire configuration data of a first image forming apparatus from the holding unit, a determination unit configured to determine whether a value defined in the acquired configuration data of the first image forming apparatus exceeds a range settable for a function of a second image forming apparatus, and a generation unit configured to, when the determination unit determines that the value defined in the acquired configuration data of the first image forming apparatus exceeds the settable range, newly generate configuration data to implement an operation to be executed based on the value defined in the configuration data of the first image forming apparatus by combining at least one other function executable by the second image forming apparatus.

According to the present invention, when configuration data of an image forming apparatus of a given model is imported to an image forming apparatus of a different model and exceeds the settable range, it can be set to perform the same behavior.

Further features of the present invention will become apparent from the following description of exemplary embodiments (with reference to the attached drawings).

BRIEF DESCRIPTION OF THE DRAWINGS

FIGS. 4A and 4B are tables exemplifying a model-specific setting value schema;

FIG. 5 is a table exemplifying virtual configuration data;

FIGS. 6A, 6B, and 6C are tables exemplifying device component data;

FIGS. 7A and 7B are tables exemplifying virtual configuration data;

FIGS. 8A and 8B are tables exemplifying virtual configuration data;

FIGS. 9A and 9B are tables exemplifying virtual configuration data;

FIG. 15 is a flowchart for explaining processing by the setting value management service.

DESCRIPTION OF THE EMBODIMENTS

Definition of Terms

First, terms in this specification will be defined.

Configuration data is setting value information for switching the operation of an image forming apparatus. More specifically, the configuration data contains the setting values of various operations in the image forming apparatus. An example is the default value of imposition for a copy job. When imposition is set to "1in1", one page is printed on one sheet as a result of copying. When imposition is set to "2in1", two pages are printed on one sheet as a result of copying.

Device component data is data representing device components in an image forming apparatus. An example is data representing whether the image forming apparatus includes a facsimile unit. Further, the device component data contains a model code for uniquely identifying the model of the image forming apparatus, and the version of running firmware.

A model-specific setting value schema is data which defines the schema of configuration data held in an image forming apparatus of a specific model. The schema is data which defines the conventions and evaluation of configuration data. For example, the model-specific setting value schema contains the setting value identifier of each configuration data, default value, range, and condition to validate data. Since implementable functions change depending on the model of each image forming apparatus, held configuration data has a difference depending on the model. Hence, the setting value schema is prepared for each model.

A virtual device is a data group of actual devices held in a server computer group. More specifically, the virtual device contains at least device component data and configuration data. To the contrary, an actual device corresponds to a physical device (for example, image forming apparatus).

Data contained in a virtual device and data held in an actual device will be called as follows to discriminate them.

Device component data contained in a virtual device will be called virtual device component data. Configuration data contained in the virtual device will be called virtual configuration data.

Device component data held in an actual device will be called actual device component data. Configuration data held in the actual device will be called actual configuration data.

First Embodiment

The first embodiment of the present invention will be described with reference to the accompanying drawings.

[Network Configuration]

Figure 1:
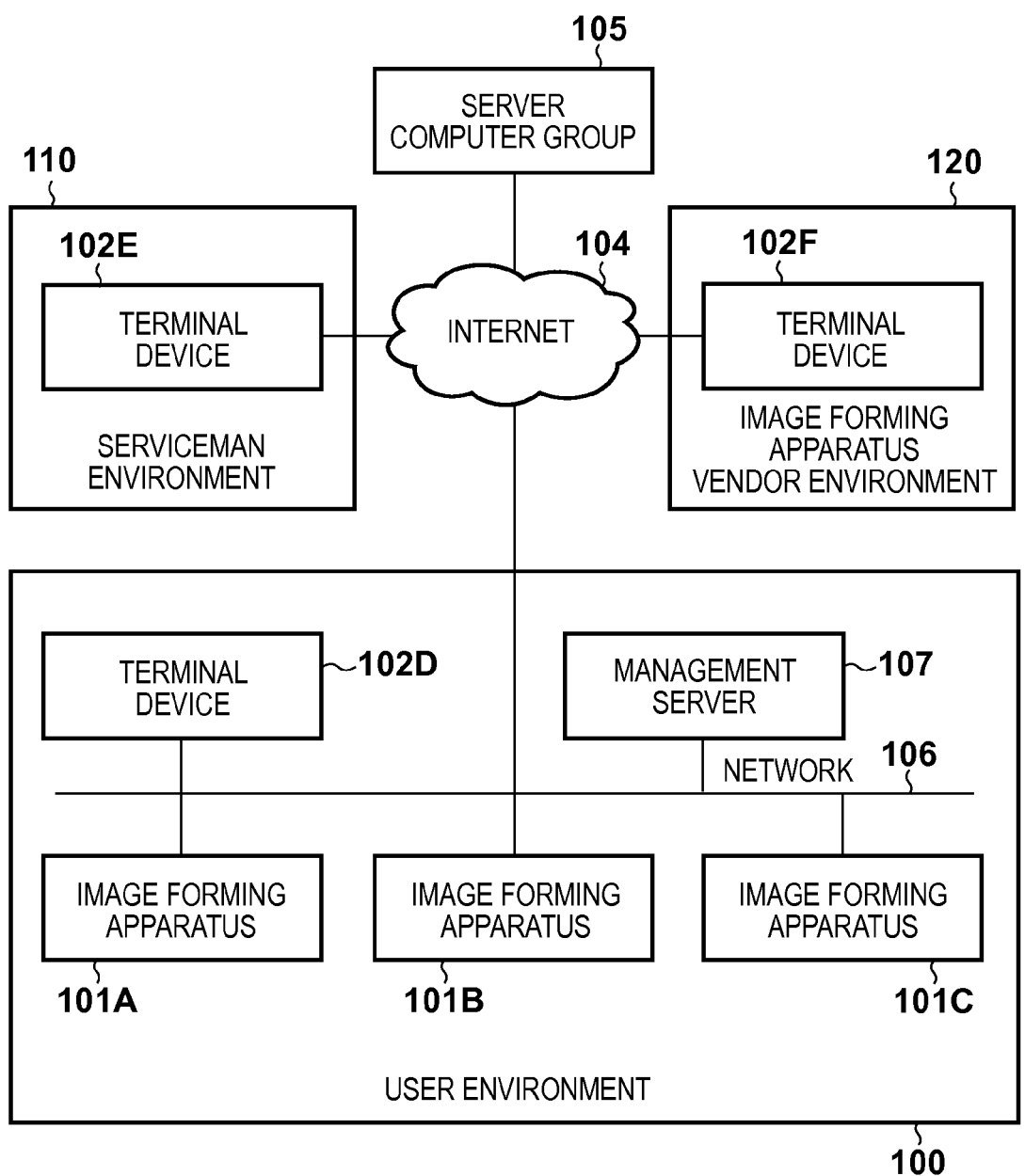
FIG. 1 is a block diagram showing a network configuration.

FIG. 1 is a block diagram exemplifying the network configuration of a system according to the embodiment. Image forming apparatuses 101A, 101B, and 101C are image forming apparatuses managed in the present invention. Each image forming apparatus in a user environment 100 can access Internet 104 via a network 106.

A terminal device 102D is a computer operable by a user in the user environment 100, and can access the Internet 104 via the network 106. A terminal device 102E is a computer operable by a serviceman who manages the image forming apparatuses 101A, 101B, and 101C. The terminal device 102E can access the Internet 104. A terminal device 102F is a computer operable by a person in charge of management who belongs to an image forming apparatus vendor. The terminal device 102F can access the Internet 104.

The terminal device 102D and the image forming apparatuses 101A, 101B, and 101C belong to the user environment 100, and are connected to each other via the network 106.

The Internet 104 is a network capable of digital communication on a public line. A server computer group 105 is a server group which provides services via the Internet 104. The network 106 connects the apparatuses to each other in the user environment 100, and enables digital communication.

A serviceman environment 110 is an environment where the serviceman for an image forming apparatus manages, for example, image forming apparatuses belonging to the user environment 100 by using the terminal device 102E. An image forming apparatus vendor environment 120 is an environment where the person in charge of management in a vendor which produces image forming apparatuses maintains data necessary to manage, for example, image forming apparatuses belonging to the user environment 100 by using the terminal device 102F.

[Hardware Arrangement]

Figure 2:
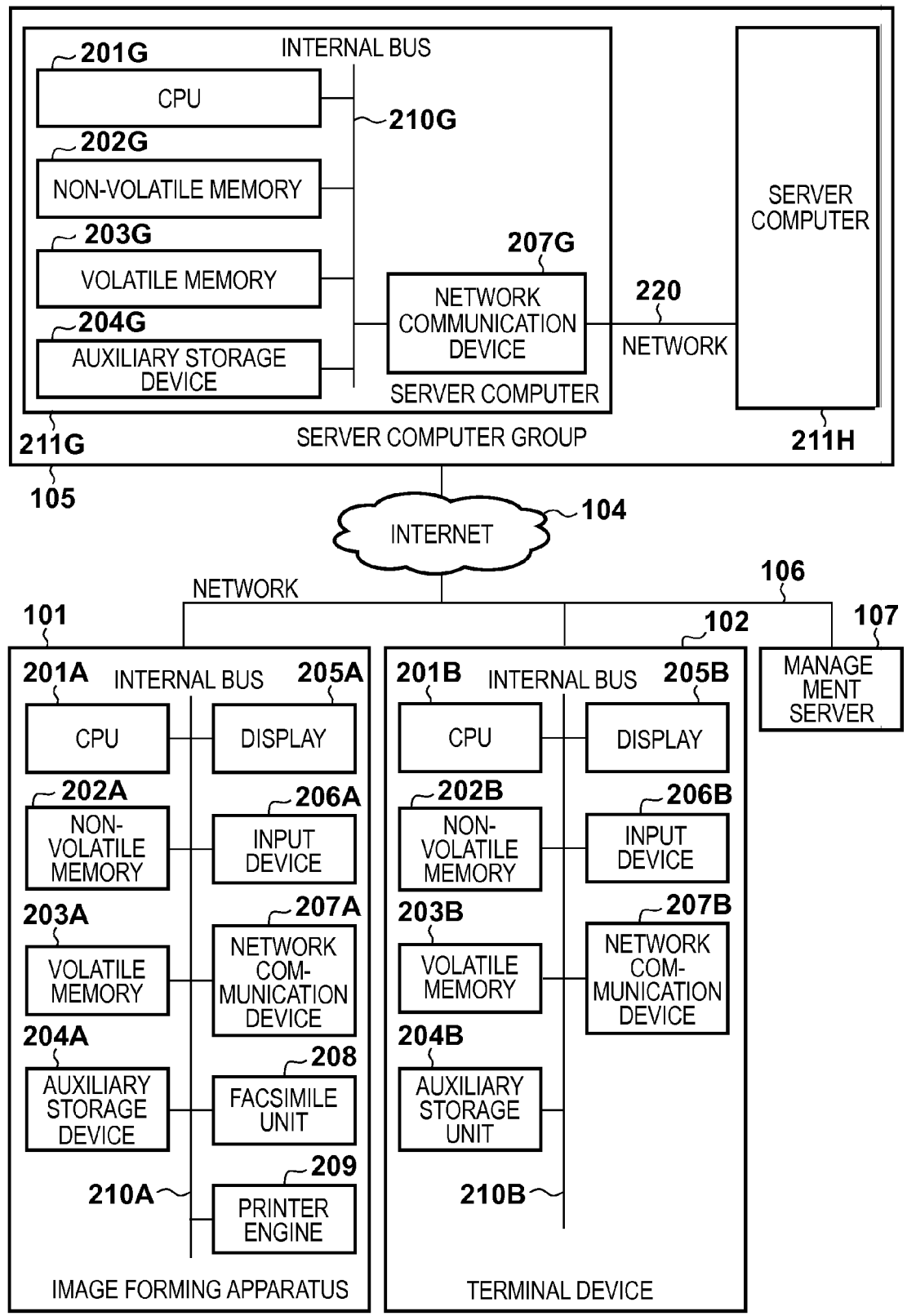
FIG. 2 is a block diagram showing a hardware arrangement.

FIG. 2 is a block diagram exemplifying a hardware arrangement according to the embodiment. A server computer 211H has the same hardware arrangement as that of a server computer 211G, so these hardware arrangements will be explained collectively.

A CPU 201 executes programs stored in a storage device, and controls various processes in a mounted apparatus. A nonvolatile memory 202 is formed from a ROM (Read Only Memory), and stores programs and data necessary at the initial stage in device activation processing. A volatile memory 203 is formed from a RAM (Random Access Memory) and used as a temporary storage location for programs and data.

An auxiliary storage device 204 is formed from a large-capacity storage device such as a hard disk or RAM drive. The auxiliary storage device 204 saves a large amount of data and holds program execution codes. The auxiliary storage device 204 stores data which need to be held for a long term, compared to the volatile memory 203. The auxiliary storage device 204 is a nonvolatile storage device and can keep storing data even after power-off.

A display 205 is a display unit for presenting information to a user. In this specification, the user assumes both a user and serviceman. An input device 206 is a device for receiving a selection instruction from a user, and transmitting it to a program via an internal bus 210.

A network communication device 207 is a device for communicating with another information processing apparatus via a network. A facsimile unit 208 is a hardware unit for transmitting, to another information device via the network 106, image data formed by the image forming apparatus 101 or image data stored in the auxiliary storage device 204. The facsimile unit 208 is an option and may not be mounted depending on the apparatus.

A printer engine 209 is a unit which prints, on a paper medium, image data formed by the image forming apparatus 101 or image data stored in the auxiliary storage device 204.

The internal bus 210 is a communication bus which connects the CPU 201, nonvolatile memory 202, volatile memory 203, auxiliary storage device 204, display 205, input device 206, and network communication device 207 so that they can communicate with each other in the image forming apparatus 101.

The server computer 211G is one of server computers which form the server computer group 105. The internal bus 210G is a communication bus which connects the CPU 201G, nonvolatile memory 202G, volatile memory 203G, auxiliary storage device 204G, and network communication device 207G of the server computer 211G so that they can communicate with each other in the server computer 211G.

A network 220 connects a plurality of server computers in the server computer group 105 to each other to enable high-speed communication between them.

[Software Arrangement]
(Image Forming Apparatus)

Figure 3:
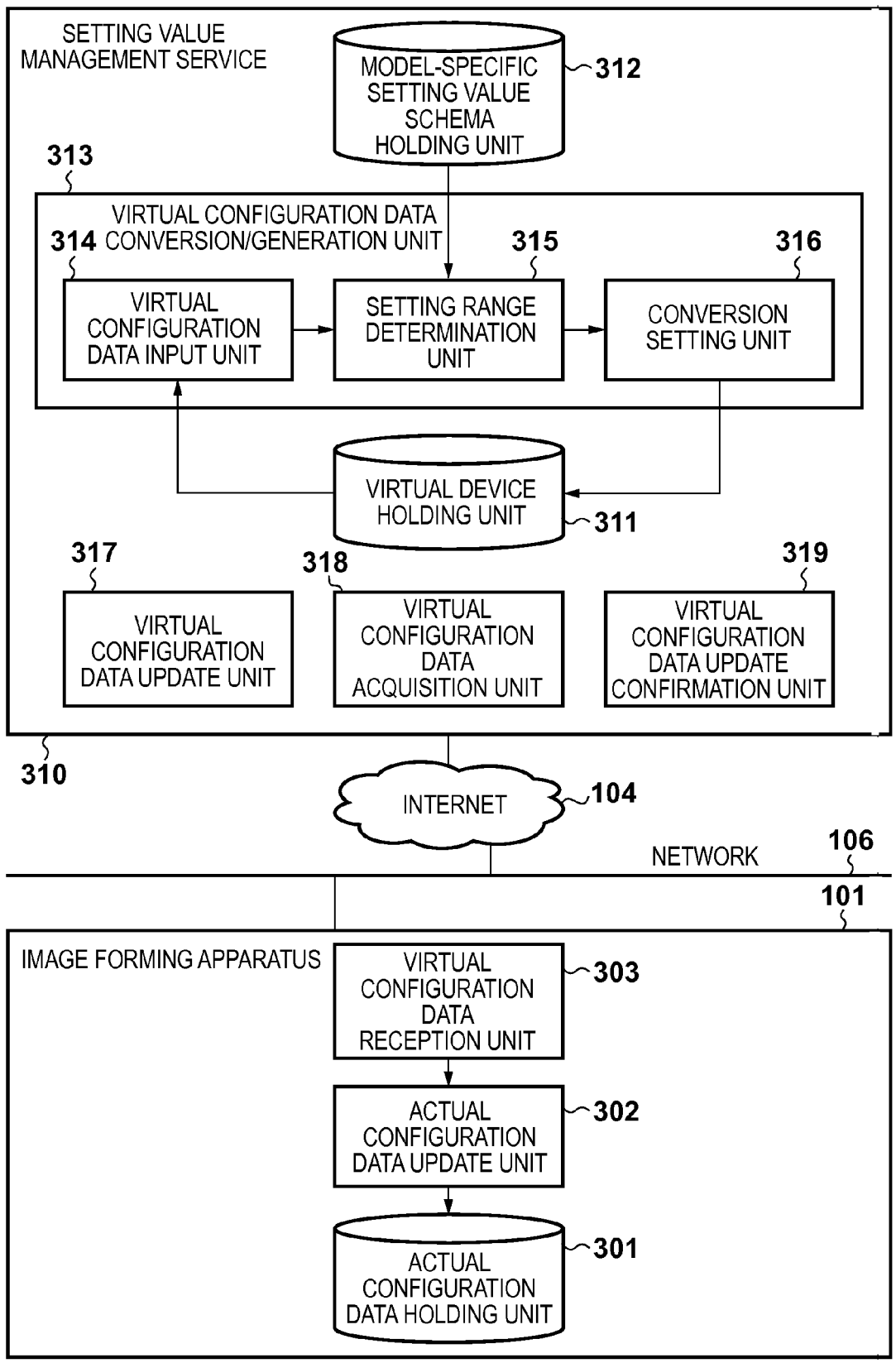
FIG. 3 is a block diagram showing a software arrangement.

FIG. 3 is a block diagram exemplifying a software arrangement according to the embodiment. The respective units of the image forming apparatus 101 will be explained first.

An actual configuration data holding unit 301 holds configuration data of the image forming apparatus 101 in the auxiliary storage device 204A serving as a storage unit. The image forming apparatus 101 switches the operation behavior based on actual configuration data held in the actual configuration data holding unit 301.

An actual configuration data update unit 302 updates actual configuration data held in the actual configuration data holding unit 301. The actual configuration data update unit 302 updates actual configuration data using virtual configuration data acquired by a virtual configuration data reception unit 303. Note that the actual configuration data update unit 302 updates actual configuration data only when a virtual configuration data update confirmation unit 319 confirms that virtual configuration data has been updated.

The virtual configuration data reception unit 303 invokes a virtual configuration data acquisition unit 318 of a setting value management service 310 (to be described later), and receives virtual configuration data. In the embodiment, an address for invoking the virtual configuration data acquisition unit 318 is an address held in the actual configuration data holding unit 301. In an example of FIG. 4A, when a setting value identifier 402 is "device settings.cloud_address", "http://oanon.com/config" is set as actual configuration data in a corresponding default value 403. Hence, the virtual configuration data acquisition unit 318 accesses "http://oanon.com/config".

(Setting Value Management Service)

Next, the respective units of the setting value management service 310 will be explained. The setting value management service 310 is a service which provides a function of managing configuration data of the image forming apparatus 101. The above-described server computer group 105 provides the setting value management service 310. Note that the two server computers 211G and 211H are connected via the network 220 in the server computer group 105 of FIG. 2. However, the arrangement is not limited to this. For example, the setting value management service 310 may be provided by one server computer or three or more server computers. The setting value management service 310 holds a plurality of units, which will be described below.

A virtual device holding unit 311 stores data held in a virtual device. Data held in a virtual device contains virtual device component data and virtual configuration data. To specify one of virtual devices, the virtual device holding unit 311 stores the device identifier of each virtual devices in correspondence with each data. Further, to specify an image forming apparatus held in a predetermined tenant, the virtual device holding unit 311 stores a tenant identifier in correspondence with each data. The tenant identifier is configured to allow uniquely identifying a tenant. The auxiliary storage device 204G in the server computer 211G stores these pieces of information.

A model-specific setting value schema holding unit 312 stores a model-specific setting value schema. One model-specific setting value schema is prepared in correspondence with each image forming apparatus model.

A virtual configuration data conversion/generation unit 313 generates virtual configuration data by converting virtual configuration data used by a specific image forming apparatus into virtual configuration data to be used by another image forming apparatus. The virtual configuration data conversion/generation unit 313 generates virtual configuration data using virtual configuration data serving as the reflection source, the model-specific setting value schema of the reflection destination, and virtual device component data.

A virtual configuration data update unit 317 registers, in the virtual device holding unit 311, virtual configuration data generated by the virtual configuration data conversion/generation unit 313. The virtual configuration data update unit 317 searches virtual devices held in the virtual device holding unit 311 for a virtual device matching a device identifier, and updates the virtual configuration data. If a notification flag 505 for the virtual device is "notified", the virtual configuration data update unit 317 sets the notification flag 505 to "not notified". The notification flag 505 is a flag representing whether the image forming apparatus 101 has been notified of update of virtual configuration data, which will be described later with reference to FIG. 5. In the embodiment, "notified" is set in the notification flag 505 if an updated virtual configuration data value has been notified, and "not notified" is set if it has not been notified.

The virtual configuration data acquisition unit 318 receives a request via the Internet 104, and acquires virtual configuration data. The received request contains at least a device identifier for specifying a virtual device. The virtual configuration data acquisition unit 318 searches for a virtual device matching the device identifier. Then, the virtual configuration data acquisition unit 318 searches for virtual configuration data held in the detected virtual device, and transfers the virtual configuration data to the requesting source.

The virtual configuration data update confirmation unit 319 confirms whether virtual configuration data has been updated. The virtual configuration data reception unit 303 of the image forming apparatus 101 transmits a device identifier to the virtual configuration data update confirmation unit 319 via the Internet 104. The virtual configuration data update confirmation unit 319 searches virtual devices held in the virtual device holding unit 311 for a virtual device matching the received device identifier. If the notification flag 505 for the detected virtual device is "not notified", the virtual configuration data update confirmation unit 319 determines that the virtual configuration data has been updated after previous search. In contrast, if the notification flag 505 is "notified", the virtual configuration data update confirmation unit 319 determines that the virtual configuration data has not been updated.

FIGS. 4A and 4B exemplify a model-specific setting value schema according to the embodiment. FIG. 4A exemplifies a model-specific setting value schema 401A for a model code "0x01". FIG. 4B exemplifies a model-specific setting value schema 401B for a model code "0x02".

The setting value identifier 402 is an identifier for uniquely identifying a setting value. For example, "copy_settings.nup" represents a setting regarding imposition in copy settings. If the setting value identifier 402 is the same, a setting value of the same type can be handled even for different models.

A default value 403 is the definition of a default setting value for the setting value identifier of a given model. A range 404 is the definition of a range of values settable for the setting value identifier of a given model. For example, the range 404 corresponding to the setting value identifier "copy_settings.nup" represents that a setting value is selectable from three values "1in1, 2in1, 4in1". Note that the default value 403 is generally specified from the range 404.

A condition 405 is the definition of a condition necessary to use a setting value for the setting value identifier of a given model. For example, the condition 405 corresponding to a setting value identifier "fax_settings.received_print" is "facsimile unit". This setting value identifier represents that the setting value becomes valid (settable) only when mounting of a facsimile unit is confirmed. The condition 405 also gives information representing, when a setting value identifier is unavailable, whether a conversion setting unit 316 can convert the setting value identifier using another function. In the example of FIGS. 4A and 4B, the following setting value identifiers are changeable:

bt(n).1.copy.copies
bt(n).1.scan_to_send.addresses
bt(n).1.scan_to_box.boxno
bt(n).1.box_to_print.copies The virtual configuration data acquisition unit 318 receives a request via the Internet 104, and acquires virtual configuration data in accordance with the received request. The received request contains at least a device identifier for specifying a virtual device. The virtual configuration data acquisition unit 318 searches for a virtual device matching the device identifier. Then, the virtual configuration data acquisition unit 318 acquires virtual configuration data held in the detected virtual device, and transfers it to the requesting source.

FIG. 5 exemplifies a virtual device list 501 stored in the virtual device holding unit 311. The virtual device list 501 shows all virtual devices held in the virtual device holding unit 311.

A device identifier 502 is an identifier for uniquely specifying a virtual device from a plurality of virtual devices contained in the virtual device list 501. Virtual device component data 503 represents a virtual device component data identifier corresponding to a virtual device. Virtual configuration data 504 represents a virtual configuration data identifier corresponding to a virtual device. The notification flag 505 is a flag representing whether the image forming apparatus has been notified of update of virtual configuration data after virtual configuration data corresponding to a virtual device is updated. In the embodiment, the virtual device component data 503 and virtual configuration data 504 are identifiers uniquely indicating data to be referred.

FIGS. 6A to 6C exemplify virtual device component data. FIGS. 6A to 6C show virtual device component data 601A to 601C, respectively. In virtual device component data, a data type 602 and value 603 are stored in correspondence with each other. An example of the data type structure includes a model code for identifying a model, a firmware version, a device identifier for identifying a device, the presence/absence of a facsimile unit, and an HDD capacity. The structure shown in FIGS. 6A to 6C is merely an example, and another data type may be added.

FIGS. 7A and 7B exemplify virtual configuration data. FIG. 7A shows part of virtual configuration data for an image forming apparatus having a device identifier "010001". FIG. 7A exemplifies the settings of a preset button. The defined preset button represents an example of the copy function. A value 703 corresponding to a setting value identifier 702 "bt1.1.copy.copies" is set to "120". In this example, a function registered for button 1 is the copy function, and the setting copy count is 120. FIG. 7B shows data generated by converting this data by the virtual configuration data conversion/generation unit 313.

At this time, even if the copy function defined in FIG. 7A is defined by combining other functions shown in FIG. 7B, it is associated with button 1. That is, a button (button 1 in this case) presented to the user remains unchanged before and after conversion, and operability when the user designates execution of an operation does not change. In other words, the user can designate execution of an operation by only designating button 1 even for configuration data generated by conversion.

[Processing Sequences (Setting Value Management Service)]

Processing sequences by the setting value management service 310 according to the embodiment will be described with reference to FIGS. 11 to 15. Respective units which execute the processes of flowcharts shown in FIGS. 11 to 15 are stored in one storage unit out of the nonvolatile memory 202G, volatile memory 203G, and auxiliary storage device 204G of the server computer 211G, and are executed by the CPU 201G.

Figure 11:
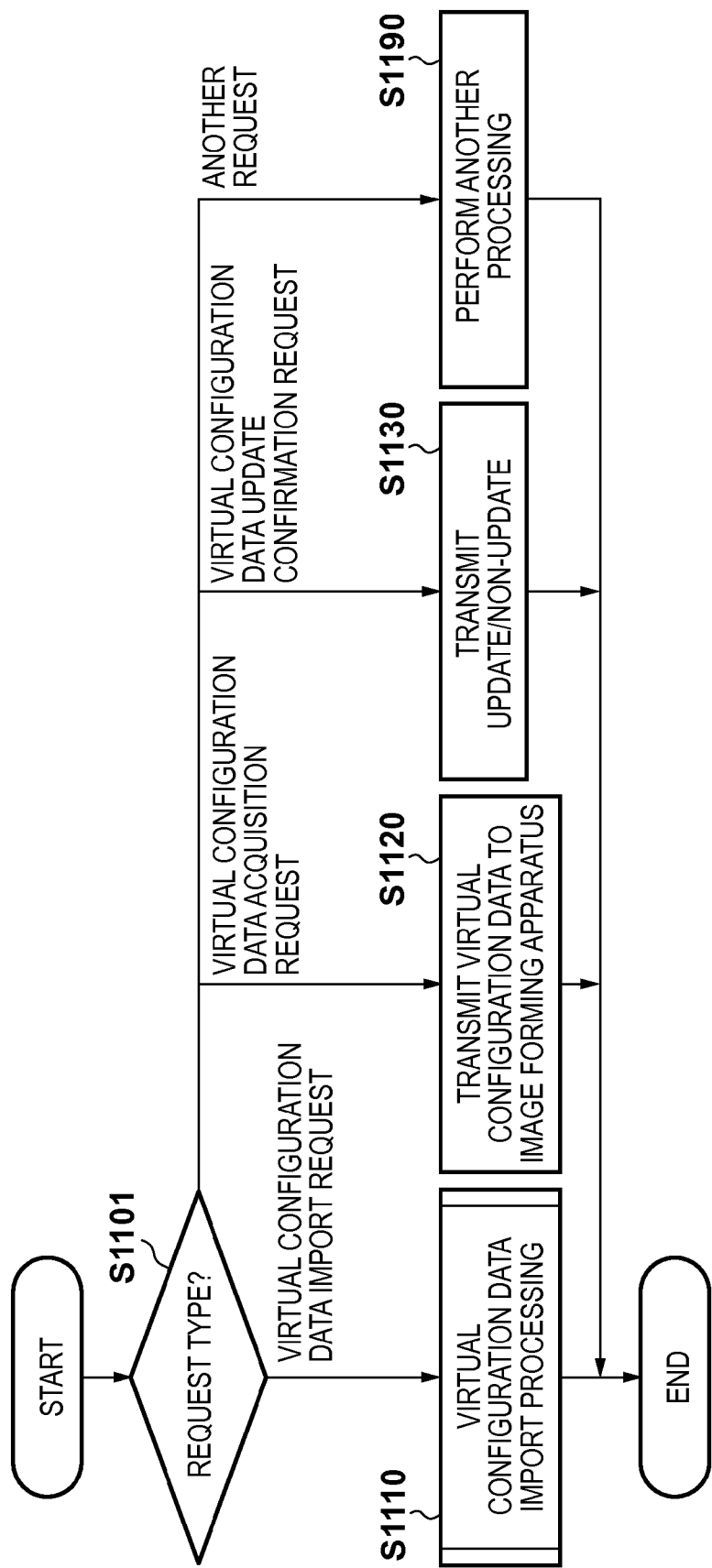
FIG. 11 is a flowchart for explaining processing by a setting value management service.

FIG. 11 is a flowchart showing request processing executed when the setting value management service 310 receives a request from the outside.

In step S1101, the setting value management service 310 determines the type of request to the setting value management service 310. If the request type is a virtual configuration data import request, the process shifts to step S1110. At this time, assume that the virtual configuration data import request designates virtual device 1 (first image forming apparatus) at the import source and virtual device 2 (second image forming apparatus) at the import destination.

In step S1110, the virtual configuration data conversion/generation unit 313 executes virtual configuration data import processing. In the processing of step S1110, virtual configuration data 2 to be used in virtual device 2 is generated based on virtual configuration data 1 of designated virtual device 1, and held in the virtual device holding unit 311. This processing will be described in detail later with reference to FIG. 12. After that, the processing sequence ends.

If the setting value management service 310 determines in step S1101 that the request type is a virtual configuration data acquisition request, the process shifts to step S1120. In step S1120, the virtual configuration data acquisition unit 318 searches the virtual device holding unit 311 for a virtual device designated by the request, and transmits the detected data to the requesting source. The processing sequence then ends.

If the setting value management service 310 determines in step S1101 that the request type is a virtual configuration data update confirmation request, the process shifts to step S1130. In step S1130, the virtual configuration data update confirmation unit 319 searches the virtual device holding unit 311 for a virtual device designated by the request, and transmits, to the requesting source, information representing update/non-update of the corresponding virtual configuration data. At this time, if the notification flag 505 shown in FIG. 5 is "not notified", the virtual configuration data update confirmation unit 319 notifies the requesting source that the virtual configuration data has been updated. If the notification flag 505 is "notified", the virtual configuration data update confirmation unit 319 notifies the requesting source that the virtual configuration data has not been updated. After that, the processing sequence ends.

If the request type is another request in step S1101, the setting value management service 310 performs processing complying with the request in step S1190, and notifies the requesting source of the processing result, as needed. The processing sequence then ends.

[Virtual Configuration Data Import Processing]

Figure 12:
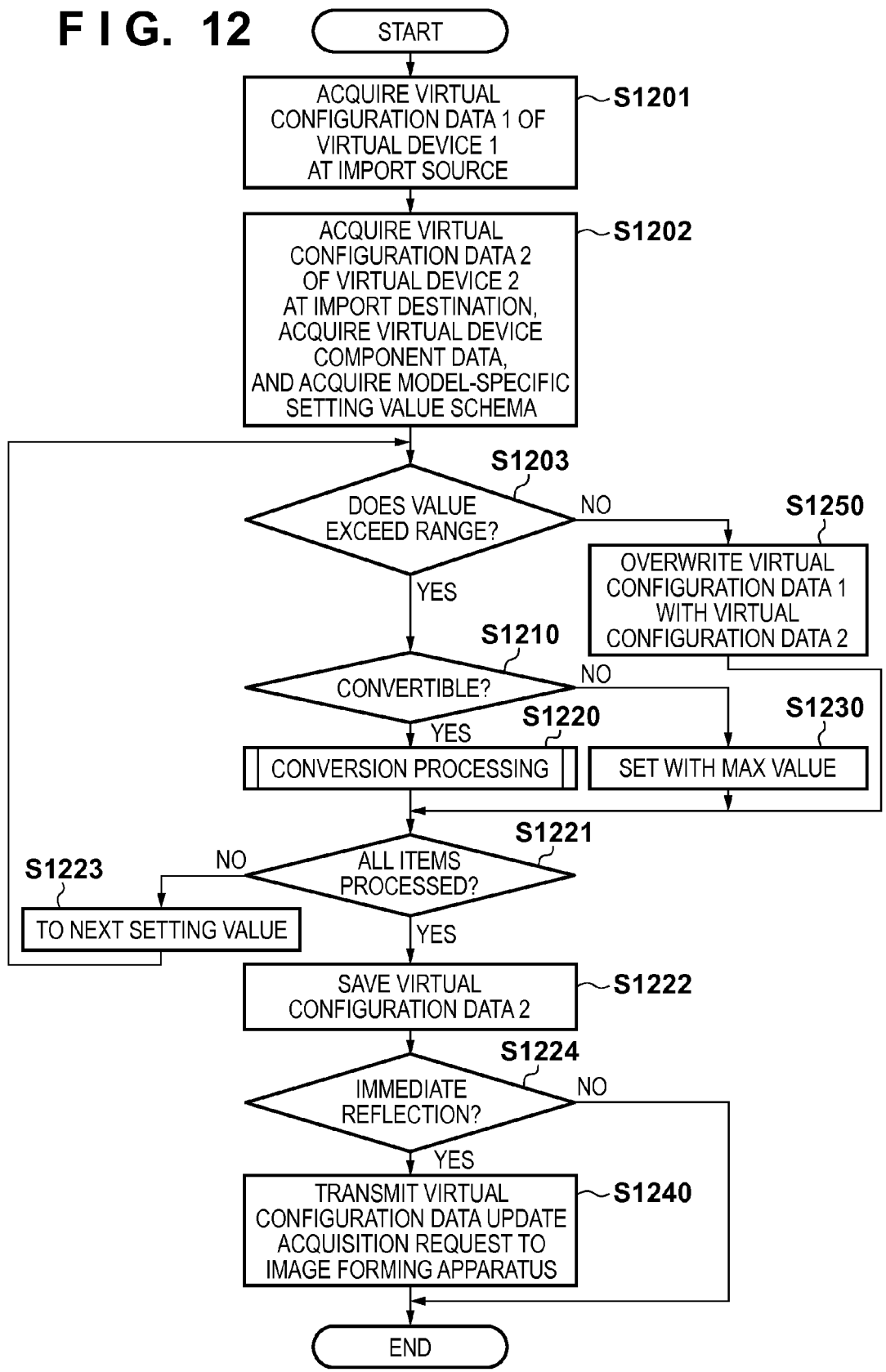
FIG. 12 is a flowchart for explaining processing by the setting value management service.

FIG. 12 is a flowchart showing details of step S1110 of FIG. 11 to be performed by the virtual configuration data conversion/generation unit 313 of the setting value management service 310.

In step S1201, a virtual configuration data input unit 314 searches the virtual device holding unit 311 for virtual configuration data 1 corresponding to virtual device 1 serving as the import source of designated configuration data, and acquires virtual configuration data 1. In step S1202, a setting range determination unit 315 searches the virtual device holding unit 311 for virtual configuration data 2 corresponding to virtual device 2 serving as the designated import destination and virtual device component data, and acquires them. Also, the setting range determination unit 315 determines a model code from the acquired virtual device component data, and acquires a corresponding model-specific setting value schema from the model-specific setting value schema holding unit 312.

In step S1203, the setting range determination unit 315 compares values corresponding to respective setting value identifiers in virtual configuration data 1 with a combination of the virtual device component data and model-specific setting value schema of virtual device 2 that have been acquired in step S1202. The setting range determination unit 315 determines whether there is a setting value identifier corresponding to a value exceeding the setting range of virtual device 2. If there is a setting value identifier corresponding to a value exceeding the setting range of virtual device 2 (YES in step S1203), the process advances to step S1210. If all values fall within the settable range (NO in step S1203), the process advances to step S1250.

In step S1210, the setting range determination unit 315 determines, based on the condition 405 of the model-specific setting value schema, whether processing by the conversion setting unit 316 is possible for the setting value identifier corresponding to the value exceeding the range. In the embodiment, "convertible" indicates that the condition 405 of the model-specific setting value schema shown in FIGS. 4A and 4B designates "convertible". If conversion is possible (YES in step S1210), the process advances to step S1220; if conversion is impossible (NO in step S1210), to step S1230.

Step S1220 is conversion processing, which will be described in detail later with reference to FIG. 13. In step S1230, the conversion setting unit 316 sets the MAX value of the model-specific setting value schema in virtual configuration data 2. After step S1220 or S1230, the process shifts to step S1221. In step S1221, the virtual configuration data conversion/generation unit 313 determines whether the processes in step S1203 and subsequent steps have been performed for all setting value identifiers described in virtual configuration data 1. If these processes have been performed for all setting value identifiers (YES in step S1221), the process advances to step S1222. If an unprocessed setting value identifier remains (NO in step S1221), the process advances to step S1223, and the virtual configuration data conversion/generation unit 313 shifts the processing target to the next setting value identifier. Then, the process returns to step S1203.

In step S1250, conversion is not necessary, and the virtual configuration data conversion/generation unit 313 overwrites virtual configuration data 2 with a value in virtual configuration data 1 for the target setting value identifier. Thereafter, the process advances to step S1221.

In step S1222, the virtual configuration data update unit 317 saves virtual configuration data 2 set in step S1220, S1230, or S1250 in the virtual device holding unit 311. In step S1224, the setting value management service 310 determines whether the virtual configuration data import request requires immediate reflection in an actual device. If immediate reflection is required (YES in step S1224), the process advances to step S1240. In step S1240, the setting value management service 310 transmits a virtual configuration data update acquisition request instruction to the image forming apparatus 101, and the processing sequence ends. If no immediate reflection is required (NO in step S1224), the processing sequence ends.

[Conversion Processing (for Copy Processing)]

Figure 13:
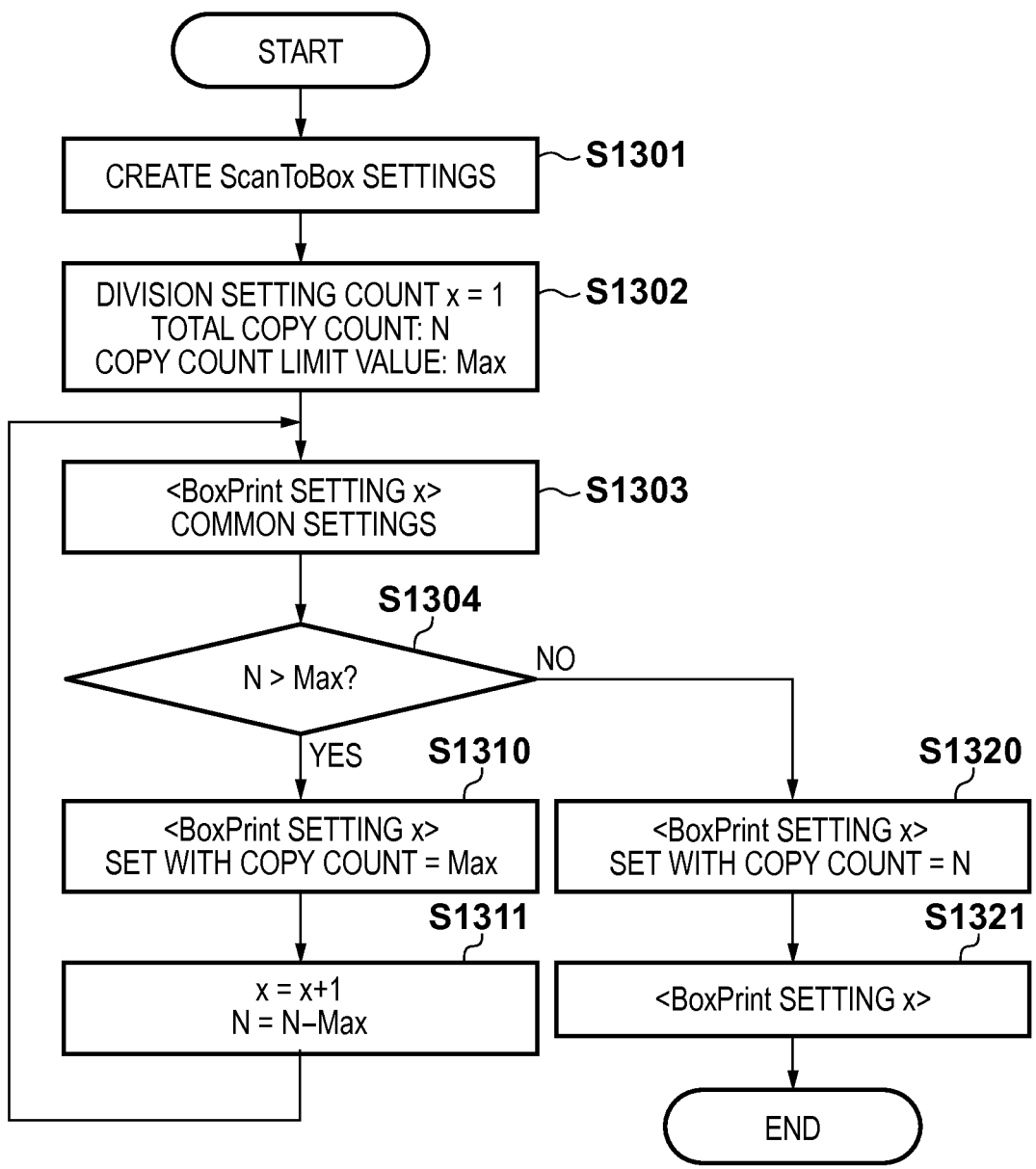
FIG. 13 is a flowchart for explaining processing by the setting value management service.

FIG. 13 is a flowchart showing a conversion operation to be performed by the virtual configuration data conversion/generation unit 313 in step S1220 of FIG. 12. In this example, the value of a setting value identifier "bt(n).1.copy.copies" shown in FIGS. 4A and 4B exceeds the range of the model-specific setting value schema. Note that examples of virtual configuration data have structures shown in FIGS. 7A and 7B. FIG. 7A shows a structure before conversion, and FIG. 7B shows a structure after conversion.

The model-specific setting value schema at the import source has a structure shown in FIG. 4A, and that at the import destination has a structure shown in FIG. 4B. FIGS. 4A and 4B exemplify preset button setting values. As a structure example of the setting value identifier, "bt1.1.copy" in FIG. 7A represents that the first function of button 1 is copy. This example also represents that detailed settings of the copy function are bt1.1.copy.color: "color"=color setting,
bt1.1.copy.copies: "120"=copy count of 120,
bt1.1.copy.nup: "2in1"=2in1 setting, and
bt1.1.copy.2sided: "1-2"=copying one-sided documents on two surfaces.

In FIG. 4B, the maximum value of a setting value identifier "copy_settings copies" indicating the maximum value of the copy count is "99". In the virtual configuration data of FIG. 7A, copying with the preset button is set to the copy count "120", which exceeds the range when virtual configuration data is imported to an image forming apparatus corresponding to the schema of FIG. 4B.

In this case, the virtual configuration data conversion/generation unit 313 combines two, ScanToBox function and BoxPrint function for the copy function of imported preset data, and sets them at preset button 1 at the import destination, implementing the same behavior. The ScanToBox function is a function of saving scanned data in the storage. The BoxPrint function is a function of executing print processing using document data saved in the storage. Assume that an image forming apparatus at the configuration data import destination can execute both the ScanToBox function and BoxPrint function.

In step S1301, the conversion setting unit 316 sets the ScanToBox function. In FIG. 7B, bt1.1.scan_to_box.color: color
bt1.1.scan_to_box.boxno: 00
bt1.1.scan_to_box.filename: 111122223333

In this example, the scan settings are color scanning, a save location "00", and a file name "111122223333".

In step S1302, the conversion setting unit 316 initializes variables used in repetitive processing. In this example, the value of the setting value identifier "bt1.copy.copies" is substituted into a variable N, and "2" is substituted into a variable x. The variable N indicates the remaining setting copy count, and the variable x is a number indicating the order of a function set at the preset button. In the example of FIG. 7B, the x value is 1 to 3. The ScanToBox function is set for x=1, and the BoxPrint function is set for x=2 and x=3. In step S1303 and subsequent steps, setting of the BoxPrint function is performed repetitively twice or more. In step S1303, the conversion setting unit 316 makes common settings of the BoxPrint function in every repeat. In FIG. 7B, bt1.(x).box_to_print.color
bt1.(x).box_to_print.boxno
bt1.(x).box_to_print.filename
bt1.(x).box_to_print.nup
bt1.(x).box_to_print.2sided are designated as setting value identifiers (x=2 and 3 in this example). Of these setting value identifiers, ~.color, ~.nup, and ~0.2sided are designated based on the values of bt1.1.copy.color, bt1.1.copy.nup, and bt1.1.copy.2sided shown in FIG. 7A.

In step S1304, the conversion setting unit 316 compares N with a maximum value designated in the range 404 of the setting value identifier "bt(n).1.copy.copies" in the setting value schema. If N is larger (YES in step S1304), the process advances to step S1310; if it is equal or smaller (NO in step S1304), to step S1320. In step S1310, the conversion setting unit 316 sets the BoxPrint function in which the copy count is set to a maximum value. In the example of FIG. 7B, bt1.2.box_to_print.copies: 99 is set. In step S1311, the conversion setting unit 316 updates the variables N and x to set the next function of the preset button. After that, the process returns to step S1303.

In step S1320 and a subsequent step, the final function of the preset button is set. In step S1320, the conversion setting unit 316 sets the remaining copy count. In the example of FIG. 7B, bt1.3.box_to_print.copies: 21 is set. In step S1321, the conversion setting unit 316 sets to delete the file used. In the example of FIG. 7B, bt1.3.box_to_print.delete: 111122223333 is set. After executing step S1321, the processing sequence ends.

In the example of FIG. 7B showing virtual configuration data generated by the above processing, button 1 is set to perform three processes in order to cope with a device at the import destination. Based on the set setting value identifiers, first, a document is scanned and the data is saved in the storage using bt1.1.scan_to_box settings. Then, the saved scanned data is printed by 99 copies using bt1.2.box_to_print settings. Thereafter, the saved scanned data is printed by 21 copies using bt1.3.box_to_print settings. Accordingly, an image forming apparatus having a maximum printing copy count of 99 can implement the same behavior as preset button 1 for copying by 120 copies in FIG. 7A.

[Conversion Processing (for Transmission Processing)]

Figure 14:
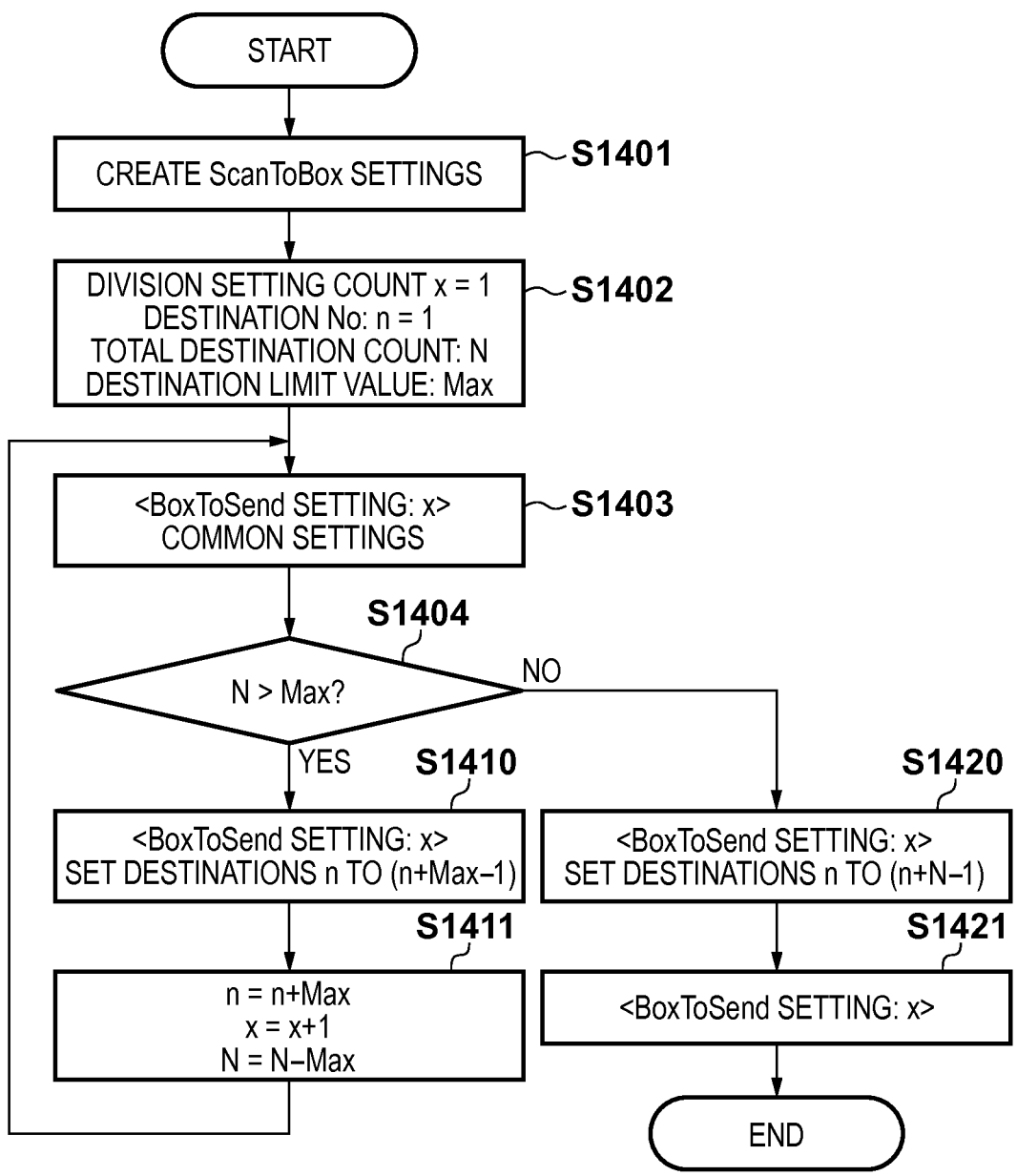
FIG. 14 is a flowchart for explaining processing by the setting value management service.

FIG. 14 is a flowchart showing a detailed operation to be performed by the virtual configuration data conversion/generation unit 313 in step S1220 of FIG. 12 when the value of a setting value identifier "bt(n).1.scan_to_send.addresses" exceeds the range of the model-specific setting value schema. Note that examples of virtual configuration data have structures shown in FIGS. 8A and 8B. FIG. 8A shows a structure before conversion, and FIG. 8B shows a structure after conversion.

An example of the model-specific setting value schema at the import source has a structure shown in FIG. 4A, and the model-specific setting value schema at the import destination has a structure shown in FIG. 4B. In this example, the maximum value of a setting value identifier "scan_to_send_addresses" indicating the maximum value of the transmission destination count at the import destination is "50", and exceeds the range. The value of a setting value identifier "bt5.1.scan_to_send.addresses" for a preset button to be imported is set to "70", and also exceeds the range. In this conversion processing, two, ScanToBox function of saving scanned data in the storage, and BoxSend function of sending document data saved in the storage are combined, implementing the same behavior. Assume that an image forming apparatus at the import destination can execute both the ScanToBox function and BoxSend function.

Step S1401 is the same as step S1301 of FIG. 13. In step S1402, the conversion setting unit 316 initializes variables used in repetitive processing. The value of "bt5.1.scan_to_send.addresses" is substituted into a variable N, "2" is substituted into a variable x, and "1" is substituted into a variable p. The variable N indicates the remaining destination count, and the variable x is a number indicating the order of a function set at the preset button. The variable p indicates a pointer for designating one of destinations to be set.

In step S1403 and subsequent steps, setting of the BoxPrint function is performed repetitively twice or more. In step S1403, the conversion setting unit 316 makes common settings of the BoxSend function in every repeat. In FIG. 8B, bt5.(x).box_to_send.boxno, bt5.(x).box_to_send.filename, and bt5.(x).box_to_send.resolution are designated as setting value identifiers. Of these setting value identifiers, ~.resolution is designated based on the setting value identifier "bt5.1.scan_to_send.resoution" in FIG. 8A.

In step S1404, the conversion setting unit 316 compares N with a maximum value designated in the range 404 of the setting value identifier "bt(n).1.scan_to_send.addresses" in the setting value schema. If N is larger (YES in step S1404), the process advances to step S1410; if it is equal or smaller (NO in step S1404), to step S1420. In step S1410, the conversion setting unit 316 sets the BoxSend function in which the destination count is set to a maximum value. In the example of FIG. 8B, bt5.2.box_to_send.addresses: 50, and bt5.2.box_to_send.ad1 to bt5.2.box_to_send.ad50 are set as setting value identifiers. In step S1411, the conversion setting unit 316 updates the variables N and x to set the next function of the preset button. After that, the process returns to step S1403.

In step S1420 and a subsequent step, the final function of the preset button is set. In step S1420, the conversion setting unit 316 sets the remaining destinations. In the example of FIG. 8B, bt5.3.box_to_send.addresses: 20, and bt5.3.box_to_send.ad1 to bt5.3.box_to_send.ad20 are set. Then, in step S1421, the conversion setting unit 316 sets to delete the file (temporary file) used. The file used is, for example, data which is created by the ScanToBox function or the like and held in the storage during execution of processing defined in configuration data. In the example of FIG. 8B, bt1.3.box_to_send.delete: file111 is set. After executing step S1421, the processing sequence ends.

In the example of FIG. 8B showing virtual configuration data generated by the above processing, button 5 is set to perform three processes in order to cope with a device at the import destination. First, a document is scanned and the data is saved in the storage using bt5.1.scan_to_box settings. Then, the saved scanned data is transmitted to 50 destinations using bt5.2.box_to_send settings. After that, the saved scanned data is transmitted to the remaining 20 destinations using bt5.3.box_to_send settings. In this manner, an image forming apparatus having a maximum designable destination count of 50 can implement the same behavior as preset button 5 for executing the ScanToSend function to 70 destinations in FIG. 8A.

[Conversion Processing (Case in which Setting Value Identifier does not Match Schema in Save Processing)]

FIG. 15 is a flowchart showing a detailed operation to be performed by the virtual configuration data conversion/generation unit 313 in step S1220 of FIG. 12 when a setting value identifier "bt(n).1.scan_to_box.boxno" does not match the model-specific setting value schema. Note that examples of virtual configuration data have structures shown in FIGS. 9A and 9B. FIG. 9A shows a structure before conversion, and FIG. 9B shows a structure after conversion.

An example of the model-specific setting value schema at the import source has a structure shown in FIG. 4A, and the model-specific setting value schema at the import destination has a structure shown in FIG. 4B. FIG. 6A exemplifies the structure of virtual device component data at the import source, and FIG. 6C exemplifies the structure at the import destination. A condition for the setting value identifier "bt(n).1.scan_to_box.boxno" shown in FIG. 4B is "HDD". However, the HDD shown in FIG. 6C has a capacity of 0 G, and the image forming apparatus does not have the storage function. Hence, the image forming apparatus is incapable of save in the HDD. In this processing, the data storage destination is converted to save data in a network server.

In step S1501, the conversion setting unit 316 deletes, in FIG. 9B, a setting value identifier "bt1.1.scan_to_box.boxno" shown in FIG. 9A. Then, the conversion setting unit 316 adds a setting value identifier "bt1.1.scan_to_box.srv", and sets the value of a setting value identifier "box_settings.server_address" in virtual configuration data. After executing step S1501, the processing sequence ends.

In the example of FIG. 9B showing virtual configuration data generated by the above processing, button 1 is set to save scanned data in a network server. Even an image forming apparatus having no HDD can implement the same behavior as preset button 1 for executing the ScanToBox function in FIG. 8A.

[Processing Sequence (Image Forming Apparatus)]

Figure 10:
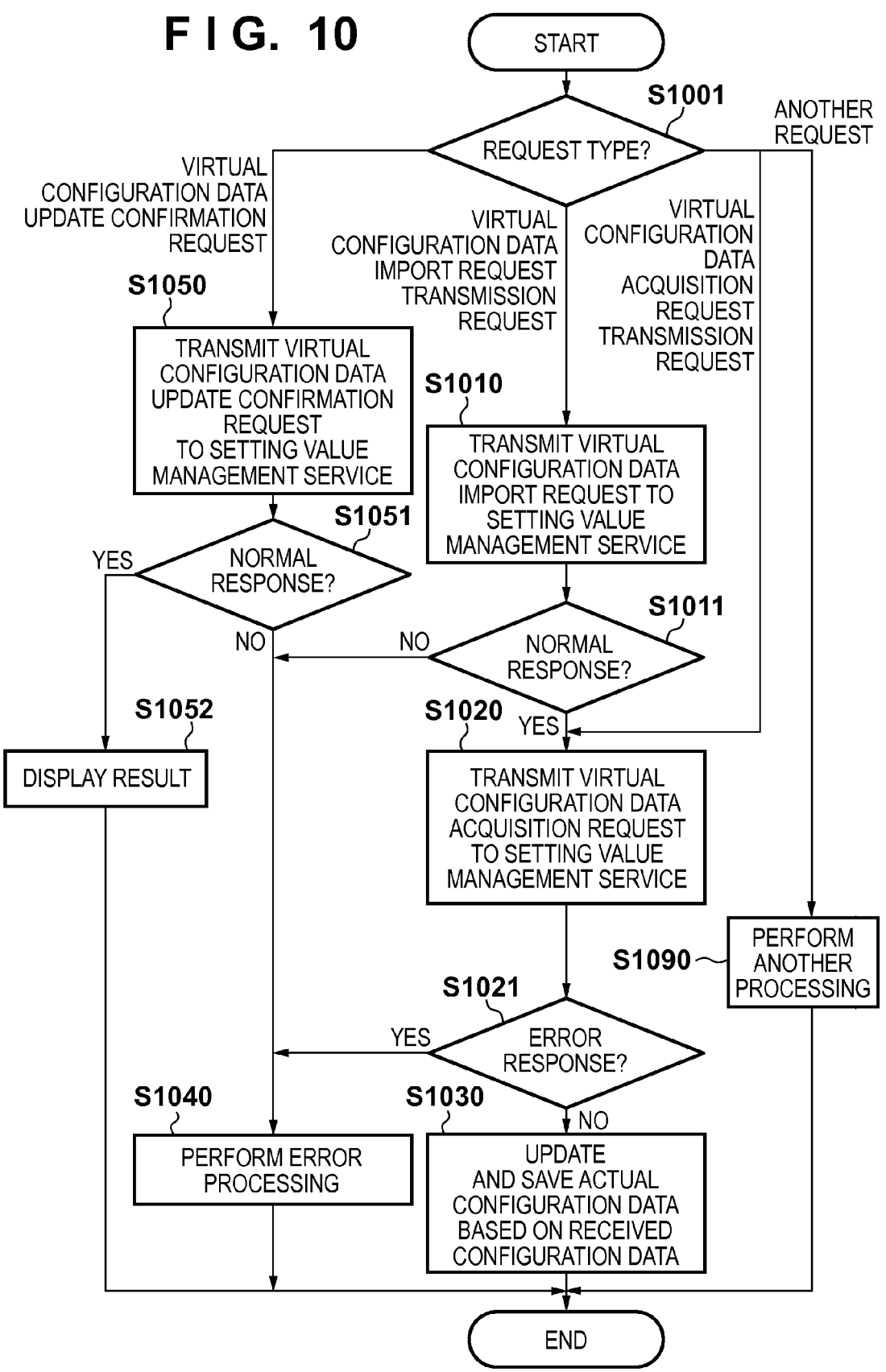
FIG. 10 is a flowchart for explaining processing by an image forming apparatus.

FIG. 10 is a flowchart in the image forming apparatus 101 according to the embodiment. Respective units which execute the processes of the flowchart are stored in one storage unit out of the nonvolatile memory 202A, volatile memory 203A, and auxiliary storage device 204A of the image forming apparatus 101, and are executed by the CPU 201A.

The image forming apparatus 101 executes this processing when a request is input to the image forming apparatus 101 from a UI panel including the display 205A and input device 206A or the terminal device 102 on the network.

In step S1001, the image forming apparatus 101 determines the input request. If a virtual configuration data import request transmission request is input to the setting value management service 310, the process advances to step S1010. If a virtual configuration data acquisition request transmission request is input, the process advances to step S1020. If a virtual configuration data update confirmation request transmission request is input, the process advances to step S1050. If another request is input, the process advances to step S1090.

In step S1010, the virtual configuration data reception unit 303 transmits a virtual configuration data import request to the setting value management service 310. If the virtual configuration data reception unit 303 receives, from the setting value management service 310 in step S1011, a message that the request has succeeded and processing has normally ended (YES in step S1011), the process advances to step S1020. If the virtual configuration data reception unit 303 receives an error response (NO in step S1011), the process advances to step S1040.

In step S1020, the virtual configuration data reception unit 303 transmits a virtual configuration data acquisition request to the setting value management service 310. After that, the virtual configuration data reception unit 303 receives a response from the setting value management service 310. If the request has succeeded and the virtual configuration data reception unit 303 normally receives virtual configuration data (NO in step S1021), the process advances to step S1030. If the virtual configuration data reception unit 303 receives an error response (YES in step S1021), the process advances to step S1040. In step S1030, the actual configuration data update unit 302 updates actual configuration data held in the actual configuration data holding unit 301 based on the received virtual configuration data. The processing sequence then ends.

In step S1050, the virtual configuration data reception unit 303 transmits a virtual configuration data update confirmation request. The virtual configuration data reception unit 303 receives a response from the setting value management service 310. If the request has succeeded and the virtual configuration data reception unit 303 normally receives virtual configuration data (YES in step S1051), the process advances to step S1052. If the virtual configuration data reception unit 303 receives an error response (NO in step S1051), the process advances to step S1040. In step S1052, the virtual configuration data reception unit 303 displays update/non-update on the UI panel or network terminal.

In step S1040, the image forming apparatus 101 performs error processing, and then the processing sequence ends. In step S1090, the image forming apparatus 101 performs requested processing, and then the processing sequence ends.

In the embodiment, requests which trigger the processes of FIGS. 10 and 11 are input by operations by, for example, a serviceman, administrator, and user. For example, the serviceman is considered to input a request using one of the image forming apparatuses 101A, 101B, and 101C and the terminal devices 102D, 102E, and 102F. The administrator is considered to input a request using one of the image forming apparatuses 101A, 101B, and 101C and the terminal devices 102D and 102E. The user is considered to input a request using one of the image forming apparatuses 101A, 101B, and 101C and the terminal device 102D. In the embodiment, as a request in FIG. 11 when the image forming apparatus is used, first, the user inputs a request to the image forming apparatus, and then the image forming apparatus transmits the request to the setting value management service.

The processes in FIGS. 10 and 11 may be triggered upon update of a value contained in configuration data in either the image forming apparatus or the setting value management service. Upon update, the setting value management service generates again configuration data, and provides it again to an image forming apparatus at the import destination.

With these procedures, when configuration data of an image forming apparatus of a given model is imported to an image forming apparatus of a different model and exceeds the settable range, it can be set to perform the same behavior. Configuration data can be generated so that even a job exceeding the performance (setting upper limit) can be executed by one operation (instruction to the preset button) in an image forming apparatus at the import destination.

In the embodiment, configuration data is provided to the user in the form of a button, but is not limited to this. For example, configuration data may be associated with each item in a selectable list form when the user designates execution of an operation.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-142311, filed Jun. 27, 2011, which is hereby incorporated by reference herein in its entirety.

What is claimed is:

1. A setting value management apparatus which manages configuration data of a plurality of image forming apparatuses, the apparatus comprising:
   a memory configured to store configuration data defined for respective models of a plurality of image forming apparatuses or for respective image forming apparatuses; and
   a CPU coupled to the memory, wherein the CPU is programmed to provide:
      an acquisition unit configured to acquire configuration data of a first image forming apparatus from the memory;
      a determination unit configured to determine whether a value defined in the configuration data of the first image forming apparatus acquired by the acquisition unit exceeds a range settable for a function of a second image forming apparatus; and
      a generation unit configured to newly generate, when the determination unit determines that the value defined in the configuration data of the first image forming apparatus acquired by the acquisition unit exceeds the settable range, configuration data to implement an operation to be executed, based on the value defined in the configuration data of the first image forming apparatus, by combining at least one other function executable by the second image forming apparatus.

2. The apparatus according to claim 1, wherein the generation unit newly generates the configuration data to include a setting for deleting a temporary file created when the newly generated configuration data is executed by another function executable by the second image forming apparatus.

3. The apparatus according to claim 1, wherein, when the determination unit determines that the value defined in the configuration data of the first image forming apparatus acquired by the acquisition unit falls within the settable range, the generation unit sets the value defined in the configuration data of the first image forming apparatus in configuration data of the second image forming apparatus.

4. The apparatus according to claim 1, wherein, when a value of the newly generated configuration data is updated, the generation unit generates the configuration data using the updated value.

5. The apparatus according to claim 1, wherein the configuration data is presented on a display unit of the second image forming apparatus as a preset of a function to be executed by the second image forming apparatus.

6. The apparatus according to claim 5, wherein the configuration data is presented on the display unit in a form of a single button that is selectable when executing a defined operation.

7. The apparatus according to claim 1, wherein, when a copy count of copy processing defined in the configuration data of the first image forming apparatus exceeds a copy count settable by a function of the second image forming apparatus, the generation unit generates the configuration data to implement an operation by combining a ScanToBox function and a BoxPrint function.

8. The apparatus according to claim 1, wherein, when a destination count of transmission processing defined in the configuration data of the first image forming apparatus exceeds a destination count settable by a function of the second image forming apparatus, the generation unit generates the configuration data to implement an operation by combining a ScanToBox function and a BoxSend function.

9. The apparatus according to claim 1, wherein, when a data storage destination defined in the configuration data of the first image forming apparatus is not a savable storage destination in the second image forming apparatus, the generation unit sets a savable storage destination in the second image forming apparatus.

10. A setting value management method of managing configuration data of a plurality of image forming apparatuses, the method comprising steps of:
   storing, in a memory, configuration data defined for respective models of a plurality of image forming apparatuses or for respective image forming apparatuses;
   acquiring, from the memory, configuration data of a first image forming apparatus;
   determining, using a microprocessor, whether a value defined in the configuration data of the first image forming apparatus acquired in the acquiring step exceeds a range settable for a function of a second image forming apparatus; and
   generating, when the value defined in the configuration data of the first image forming apparatus acquired in the acquiring step is determined in the determination step to exceed the settable range, new configuration data to implement an operation to be executed, based on the value defined in the configuration data of the first image forming apparatus, by combining at least one other function executable by the second image forming apparatus.

11. A non-transitory computer-readable medium storing a program that when executed causes a computer to function as:

a memory configured to store configuration data defined for respective models of a plurality of image forming apparatuses or for respective image forming apparatuses;

an acquisition unit configured to acquire configuration data of a first image forming apparatus from the memory;

a determination unit configured to determine whether a value defined in the configuration data of the first image forming apparatus acquired by the acquisition unit exceeds a range settable for a function of a second image forming apparatus; and a generation unit configured to newly generate, when the determination unit determines that the value defined in the configuration data of the first image forming apparatus acquired by the acquisition unit exceeds the settable range, configuration data to implement an operation to be executed, based on the value defined in the configuration data of the first image forming apparatus, by combining at least one other function executable by the second image forming apparatus.

* * * * *